United States Patent [19]

Rispoli et al.

[11] 4,188,410
[45] Feb. 12, 1980

[54] FOAM FRYING

[75] Inventors: Joseph M. Rispoli, Massapequa Park; Morris A. Rogers, Mt. Vernon; Rex J. Sims, Pleasantville; Reuben H. Waitman, Sr., Pearl River, all of N.Y.

[73] Assignee: General Foods Corporation, White Plains, N.Y.

[21] Appl. No.: 920,527

[22] Filed: Jun. 29, 1978

[51] Int. Cl.$^2$ .............................................. A23L 1/01
[52] U.S. Cl. .................................. 426/296; 426/302; 426/438; 426/439; 426/441; 426/555; 426/564; 426/652; 426/654; 426/662
[58] Field of Search ............... 426/289, 296, 302, 564, 426/549, 555, 604, 611, 612, 622, 654, 438, 439, 440, 441, 509, 662, 652

[56] References Cited

U.S. PATENT DOCUMENTS

| | | | |
|---|---|---|---|
| 1,831,728 | 11/1931 | Working | 426/24 |
| 1,965,490 | 7/1934 | Conway et al. | 426/604 |
| 1,982,186 | 11/1934 | Working | 426/611 |
| 2,089,470 | 8/1937 | Epstein et al. | 426/604 |
| 2,280,427 | 4/1942 | Thurman | 426/329 |
| 2,640,780 | 6/1953 | Mattikow | 426/604 |
| 2,724,649 | 11/1955 | Julian et al. | 426/604 |
| 3,078,172 | 2/1963 | Libby | 426/438 X |
| 3,480,544 | 11/1969 | Hilty | 426/662 X |
| 3,508,926 | 4/1970 | Werbin et al. | 426/439 X |

Primary Examiner—Arthur L. Corbin
Attorney, Agent, or Firm—Mitchell D. Bittman

[57] ABSTRACT

A method for frying comestibles comprising frying the comestible in a frying medium containing an oil or fat and an amount of an emulsifier effective to foam the oil or fat during frying. The emulsifiers can be added to the frying medium as part of a dry coating mix which is coated onto the comestible prior to frying.

26 Claims, No Drawings

FOAM FRYING

BACKGROUND

Cooking of the comestible during frying occurs by the transfer of heat from the hot oil or fat to the comestible along points of contact between the comestible and the oil or fat. Frying is generally carried out by either deep-fat frying (i.e., immersing the comestible in the hot oil of fat), or pan-frying (i.e., placing at least sufficient oil or fat on a pan to cook a surface of the comestible). Since cooking occurs where the hot oil or fat is in contact with the comestible, substantial amounts of oil or fat are generally required to fry the comestible. Aside from the frying being limited by the amount of oil or fat used to fry, associated with frying is the dangerous and explosive splattering of grease and the resultant mess and post frying cleanup.

Accordingly, a main feature of this invention is to provide a means for frying foods with a substantial reduction in the amount of fat or oil needed to fry.

It is also a feature of this invention to fry foods without substantial splattering and post fry cleanup.

A further feature of this invention is to provide a foam fried comestible which is comparable in taste, texture and appearance with ordinarily fried comestibles.

A further feature of this invention is to cook comestibles in a foaming frying medium.

SUMMARY

Briefly stated, this invention comprises frying a comestible in a frying medium which comprises an oil or fat and an amount of an emulsifier effective to foam the fat or oil during frying. The amount of fat or oil and emulsifier need be present in an amount effective to foam the fat or oil at a level sufficient to cook the comestible in the foaming frying medium. The emulsifier may be incorporated into the frying medium as part of a dry coating mix which is coated onto the comestible prior to frying.

DETAILED DESCRIPTION OF THE INVENTION

The instant invention provides a novel method of cooking or frying comestibles. Instead of, as is generally taught in the art, avoiding foaming when frying with fat or oil, the instant invention encourages foaming of the fat or oil during frying so as to create an artificially high level of heat transfer medium thus enabling the use of substantially reduced amounts of fat or oil. This invention encourages foaming by incorporating into a frying medium comprising a fat or oil, an amount of an emulsifier effective to foam said fat or oil during frying, the level of foam being sufficient to cook the comestible in the foaming frying medium.

The essential criteria of the emulsifier which is to be added to the fat or oil as part of the frying medium is the ability of the emulsifier to cause the fat or oil to foam during frying of the comestible, i.e., the ability to cause the frying comestible to release its moisture in the form of a foam (i.e., a mass of fine bubbles). Other important criteria of the emulsifier is the ability to cause the fat or oil to foam gradually, gently and without substantial splattering during frying of the comestible, i.e., to cause the frying comestible to release its moisture gradually and gently. Other desirable characteristics of the emulsifier include the ability to maintain the foam during the entire cooking procedure as well as to foam fry the comestible in the fat or oil but without substantial sticking or burning on the frying surface.

Appropriate emulsifiers include citric acid esters of mono and diglycerides, phosphated mono and diglycerides, sodium stearyl fumarate and sodium sulfo-acetate derivatives of mono and diglycerides. However, the preferred emulsifier is lecithin (a phospholipid). Lecithin is preferred due to its ability to sustain a desired level of foam for relatively long periods of time while preventing sticking and burning, as well as foaming without substantial splattering. The various types of lecithin that may be employed include liquid, liquid hydroxylated, dried, or pure dried lecithin and the like. Lecithin is also able to produce a desirable level of foam at relatively low levels of use, i.e., generally within about 3 to 35% and preferably within about 4 to 10% by weight of the fat or oil in the frying medium, the levels of lecithin being based on the amount of pure lecithin (without carriers) in the frying medium. Use of levels of lecithin above 35% by weight of the fat or oil in the frying medium are not generally preferred as the foam has a tendency to darken, the comestible tends to burn more easily and distinct off flavors and aromas may become apparent.

The fat or oil in the frying medium may be any fat or oil suitable for frying, the fat or oil consisting essentially of glyceride esters of fatty acids with the distinction between fats and oils being that fats are ordinarily solid at room temperature while oils are ordinarily liquid at room temperature. Suitable fats or oils may be derived from animals, fruits, vegetables, plants, seeds, etc. and include lard, tallow, butterfat, olive oil, palm oil, coconut oil, cottonseed oil, peanut oil, sesame oil, corn oil, soybean oil, sunflower oil, fish oil, oleo oil etc. and combinations thereof.

The fat or oil and emulsifiers need be present in an amount effective to provide a level of foam sufficient to cook the comestible in the foaming frying medium. Due to the foaming effect an artifically high level of heat transfer medium is created thus enabling substantially reduced levels of fat or oil to be employed to cook or fry the comestible. Preferably the amount of fat or oil in the frying medium is sufficient to create a height of fat or oil on the frying surface (without foaming) within the range of about 0.4 to 15 mm. This translates into about ⅛ cup (30 ml.) to 2 cups (474 ml.) of oil or fat needed in a 12-inch pan to foam fry a comestible. When foam frying, to be included in the amount of fat or oil in the frying medium is the fat or oil added directly to the frying surface as well as any fat or oil contributed from the comestible or the coating on the comestible. In a comparison of the levels of oil or fat needed in foam frying verses ordinary frying, when foam frying with ¼ cup (59 ml.) of oil and 7.0% of lecithin by weight of the oil, to create the same level of heat transfer medium in ordinary pan-frying generally at least 2 cups (474 ml.) of oil would be needed.

The amount of fat or oil to be used in the frying medium is also dependent upon the amount of emulsifier added and moisture in or on the comestible, and the resultant level of foam during frying. Preferably the level of foam created during frying is sufficient to reach at least about half (50%) the height of the comestible for a major portion of the cooking time, but without the foam flowing over the sides of any pan or frying utensil in which the comestible is foam fried. The foaming of the fat or oil during frying generally creates at least a 25% increase and preferably at least an 8-fold increase in the height of the fat or oil.

In order to create the foaming action, moisture need be present in some form, i.e., either in the food, on the surface of the food or added extraneously to the frying medium, as the foaming action is caused by the release of moisture in the form of a foam. The comestible itself will generally provide sufficient moisture to induce the desired foaming action.

As an alternative method of cooking the comestible, water can be added to the frying medium forming an oil or fat/water mixture (or emulsion). When heat is applied to the mixture there may be some minor foaming action at first, followed by the comestible being cooked by boiling of the mixture and then, after sufficient water has boiled off (vaporized) the foaming action will reappear and the comestible will be foam fried. Thus, basically there is a stewing of the comestible until sufficient water is boiled off for the foam to reappear to foam fry the comestible. The only limit to the amount of water which can be added to this oil or fat/water mixture is a practical one, in that the higher the lever of water the longer it will take for the water to boil off and the foaming action to reappear.

The emulsifier can be incorporated by any convenient method into the fat or oil of the frying medium in order to obtain the foaming effect during frying. These methods include (but not excluding other methods): adding the emulsifier in solid or liquid form to the fat or oil; incorporating or blending (dry or wet) the emulsifier with the fat or oil in the processing of the fat or oil; incorporating the emulsifier into a fat or oil to produce a solid form (e.g., stick, bar, flake, granule); and adding the emulsifier as part of a dry coating mix for coating the comestible prior to frying. Conceivably the emulsifiers can even be added to the comestible itself, so long as during frying sufficient emulsifier is released into the frying medium to obtain the foaming effect during frying. The emulsifier can be added as part of a dry coating mix by simply adding the emulsifier in the form of a dry powder, flakes or granules to the coating mix, or by adding the emulsifier (with or without a liquid carrier such as an oil) plated onto dry carriers such as sugars, fibers, bread crumbs, bulking agents, etc., or by adding an encapsulated emulsifier (e.g. encapsulated with solid fat, oil or other agents). For example, a lecithinated powdered shortening is formed by melting shortening and adding the desired amount of lecithin. When both shortening and lecithin are completely melted and blended the mixture is poured into a flat pan and cooled in a freezer until solid. The solid mixture is then ground with dry ice in a blender, the particles screened and dried.

The emulsifier is preferably added as part of a dry coating mix. The dry coating mix, aside from the emulsifier, contains ingredients which are common to the coating mix art such as fat or oil (e.g., hydrogenated vegetable oil), protein (e.g., egg solids, soy, milk), flour, bulking agents (e.g. bread crumbs, fines) and seasonings (e.g., salt, paprika, monosodium glutamate, pepper, etc.). The dry coating mix preferably contains lecithin at a level of about 3–35% (preferably 4–10%), fat or oil at a level of 0–75% (preferably 4–30%), protein at a level of 0–30% (preferably 4–18%), flour at a level of 0–80% (preferably 10–55%) and seasonings at a level of 4–40% (preferably 12–32%), all being by weight of the dry coating mix. The fat or oil is not a necessary ingredient of the dry coating mix as long as a sufficient source of fat or oil for the frying medium is added directly to the frying surface or available from the comestible itself. Other typical ingredients which may be added to the dry mix include cornstarch, leavening agents, baking soda, baking powder, dried whey, soy grits, wheat bran, various flours (e.g., soy, corn, rice, etc.), raw and modified starches, bulking agents (e.g., crumbs, fines), wheat gluten, corn syrup solids, sugar, lactose, dextrose, barley, whole egg solids, egg yolk solids, spices (e.g., pepper, rosemary, sage, paprika), mustard, garlic, onion, tomato solids, milk solids, flavor enhancers, natural and artificial flavors and colors, tenderizers, preservatives, anti-caking or flow agents (e.g., silica gel) etc. The dry coating mix may be either applied onto the comestible in its dry form or may be mixed with a liquid (e.g., water, milk, sauce) to form a batter which is then applied onto the comestible.

Aside from the benefit of enabling the use of lower levels of fat or oil to fry comestibles, the instant invention also has the benefit of substantially reducing splatter and the associated hazard and mess. The reduction of splatter is most pronounced either when minimal levels of oil or fat are employed along with higher levels of an emulsifier such as lecithin, or when high amounts of oil or fat are employed with lower levels of an emulsifier such as lecithin. For example, when 2½ pounds (1.14 Kg) of chicken pieces were foam fried in ¼ cup (59 ml.) of oil with 7.0% by weight of the oil lecithin added, and compared to a control of 2½ pounds (1.14 Kg) of chicken pieces fried in 2 cups (474 ml.) of oil (normal pan frying), the control was observed to have greater than ten times by weight of oil splattered from the frying pan than was observed from foam frying. A sheet of aluminum foil has been placed above the frying pans in a position to catch all material splattering from each of the frying pans.

A further unexpected benefit of this invention was that when compared to its pan fried counterpart (prepared as above) the foam fried comestible was found to be more moist and have a higher cooking yield, while having a lower fat, carbohydrate and calorie content (on a per gram basis).

Generally, the comestible will be foam fried at a temperature within the range of about 260° F. to 400° F., preferably 320° F. to 370° F., with care being taken not to burn the comestible or emulsifier or cause excessive splattering. Appropriate comestibles include such categories as meat, fish, poultry and vegetables. For example, chicken pieces, chicken cutlets, pork chops, beef steaks, fish fillets, or vegetable strips are all suitable.

EXAMPLE I

A dry coating mix was prepared by blending the following ingredients: 41.7 parts of all purpose flour, 20 parts hydrogenated vegetable oil, 12.2 parts egg white solids, 7.4 parts of dry lecithin, 2 parts silica gel and 16.7 parts of seasoning (salt, paprika, monosodium glutamate, pepper).

A 2½ pound (1.14 Kg) cut-up chicken was wetted with water and each chicken piece was coated (about 85 grams of coating mix to coat all the chicken pieces). The coated chicken pieces were placed skin side down in a preheated (350° F.), 12-inch skillet with ¼ cup (59 ml.) of oil added thereto. The pieces were foam fried for 10–15 minutes on each side until golden brown; then the heat was reduced to about 320° F., the chicken pieces were turned, and the frying was continued for about 25-30 minutes longer to fully cook the chicken, followed by draining the chicken pieces. During cooking the foam level was generally at a height of about 50 to 70% (within the range of 35 to 95%) of the height of the chicken pieces. There was minimal splattering observed and no sticking or burning of the chicken onto the pan surface. The level of lecithin was about 7.0% by weight of the fat or oil in the frying medium. The resultant foam fried chicken pieces had a golden brown appearance, with a crisp and crunchy coating and had the taste, texture and appearance of ordinary pan-fried, coated chicken pieces. The chicken was not greasy and had tender and moist texture and taste.

EXAMPLE II

Eggplant slices (about 6.3 cm wide and 0.6 cm thick) were dipped in water, then coated with the dry coating mix of Example I (about 50 grams of coating mix to coat the 8 slices of eggplant). The coated slices were placed in a preheated (350° F.), 12-inch skillet with ¼ cup (59 ml.) of oil added thereto. The coated slices were foam fried for 4 minutes, turned, and foam fried for an additional 4 minutes, followed by draining. The level of foam during frying was generally at about 95% (within the range of about 25 to 95%) of the height of the eggplant slices. The level of lecithin was about 7.0% by weight of the fat or oil in the frying medium. Minimal splattering and no sticking or burning was observed. The resultant foam fried coated eggplant slices had a crisp, golden brown and light coating and had the taste, texture and appearance of ordinary pan-fried, coated eggplant slices. The eggplant itself was firm, tender and moist.

EXAMPLE III

The dry coating mix of Example I was added at a level of 100 grams to ½ cup (119 ml.) of water and blended until a smooth batter-like consistency was obtained. Pork chops (five chops, about 1.3 cm thick) were completely covered with the batter, letting the excess run off. The batter-coated chops were placed in a preheated (350° F.), 12-inch skillet with a ¼ cup (59 ml.) of oil added thereto. The chops were foam fried for 10 minutes on each side until golden brown, then the heat was reduced to 325° F. and the chops were fried for another 25 minutes to fully cook the chops, followed by draining. During foam frying the level of foam was generally at about 80 to 95% (within the range of 50 to 95%) of the height of the pork chops. The level of lecithin in the frying medium was about 5.6% by weight of the fat or oil in the frying medium. Minimal splattering and no sticking or burning was observed. The resultant foam fried, batter-coated pork chops had a flaky, golden brown coating and had the taste, texture and appearance of ordinary pan-fried, batter-coated pork chops. The meat was very moist and tender and the pork chops did not shrink to the extent normally observed in ordinary pan-frying.

EXAMPLE IV

A phosphated mono and diglyceride of partially hydrogenated vegetable oil (EMCOL F27-85) was added to a liquid vegetable oil at a level of 30% by weight of the vegetable oil, by heating the emulsifier and oil together in a boiling water bath.

The emulsified oil was added at a level of ¼ cup (59 ml.) to a 12-inch skillet and was then heated to 350° F. Chicken pieces (2½ pounds, 1.14 Kg) were coated with seasoned flour and then placed skin side down into the preheated skillet. The chicken pieces were foam fried for about 10 minutes on each side and then the heat was reduced to 320° F. and the frying continued an additional 25-30 minutes, turning once, followed by draining. During foam frying the level of foam was generally at about 50% (within the range of about 25 to 70%) of the height of the chicken pieces. There was minimal splattering, burning and sticking observed. The resultant foam fried chicken pieces were tender and moist with the taste, texture and appearance of ordinary pan-fried, coated chicken pieces.

EXAMPLE V

A 2½ pound (1.14 Kg) cut-up chicken was wetted with water and each chicken piece was coated with the dry coating mix (about 85 grams) of Example I. The coated chicken pieces were placed skin side down in a preheated (360° F.), 12-inch skillet with ¼ cup (59 ml.) of oil and one cup (237 ml.) of water added thereto. The chicken pieces were fry-boiled for 15 minutes, turned and fry-boiled for an additional 15 minutes, with the added water vaporizing within about 20 to 30 minutes after the beginning of the cooking process. The temperature was then reduced to 320° F., and the chicken pieces were turned and foam fried for an additional 20 minutes. During frying the level of foam reached at least about 50% of the height of the chicken pieces. The resultant boiled and foam fried chicken pieces had a very crisp skin similar to ordinary fried chicken and the chicken itself was very moist and tender.

What is claimed is:

1. A method for frying comestibles which comprises: frying a comestible in a frying medium which comprises an oil or fat and an amount of an emulsifier effective to foam said oil or fat during frying, wherein the amount of fat or oil and emulsifier is effective to foam said fat or oil at a level sufficient to cook said comestible in the foaming frying medium and create an artificially high level of heat transfer medium, said level of foam creating at least a 25% increase in the height of the fat or oil.

2. Method of claim 1 wherein the emulsifier is selected from the group consisting of lecithin, the citric acid ester of mono and diglycerides, phosphated mono and diglycerides, sodium stearyl fumarate and sodium sulfo-acetate derivatives of mono and diglycerides.

3. Method of claim 1 wherein the emulsifier is lecithin and the effective amount of lecithin is from about 3 to 35% by weight of the fat or oil.

4. Method of claim 3 wherein the effective amount of lecithin is from about 4 to 10% by weight of the fat or oil.

5. Method of claims 2 or 3 wherein the emulsifier is added to the frying medium as part of a dry coating mix which is coated onto the comestible prior to frying.

6. Method of claim 5 wherein the emulsifier is lecithin which is added to the dry coating mix at a level of about 3 to 35% by weight of the dry coating mix.

7. Method of claim 5 wherein the dry coating mix is first mixed with a liquid to form a batter prior to coating the comestible.

8. Method of claims 2 or 3 wherein the emulsifier is incorporated in the fat or oil prior to frying.

9. Method of claims 2 or 3 wherein the amount of fat or oil is sufficient to provide a height of oil or fat on the cooking surface within the range of about 0.4 to 15 mm.

10. Method of claims 2 or 3 wherein the level of foam is at least about 50% of the height of the comestible for a major portion of the frying time.

11. Method of claims 2 or 3 wherein the comestible is fried at temperatures within the range of about 260° to 400° F.

12. Method of claims 2 or 3 wherein the level of moisture in the comestible is sufficient to create the desired foaming action.

13. Method of claims 1 or 2 further comprising: prior to frying, boiling the comestible in an oil or fat/water mixture, wherein sufficient water is vaporized during boiling to allow the oil or fat to subsequently foam during frying.

14. Method of claims 2 or 3 wherein the foaming of the fat or oil during frying creates at last an 8-fold increase in the height of the fat or oil.

15. A dry coating mix for coating comestibles prior to frying in fat or oil comprising an amount of an emulsifier effective to foam said fat or oil and create at least a 25% increase in the height of the fat or oil when the comestible is coated with the dry coating mix and fried, and wherein the amount of fat or oil and emulsifier present when the comestible is coated with the dry coating mix and fried is effective to foam said fat or oil at a level sufficient to cook said comestible in the foaming frying medium and create an artificially high level of heat transfer medium.

16. Dry mix of claim 15 wherein the emulsifier is selected from the group consisting of lecithin, the citric acid ester of mono and diglycerides, phosphated mono and diglycerides, sodium stearyl fumarate and sodium sulfo-acetate derivatives of mono and diglycerides.

17. Dry mix of claim 16 wherein the emulsifier is lecithin and the amount of emulsifier is within the range of about 3 to 35% by weight of the dry coating mix.

18. Dry mix of claim 17 wherein the amount of emulsifier is within the range of about 4 to 10% by weight of the dry coating mix.

19. Dry mix of claim 18 further comprising flour and seasonings.

20. Dry mix of claim 19 further comprising protein, a fat or oil, and bulking agents.

21. Dry mix of claims 16 or 19 wherein the dry mix is coated onto the comestible after mixing the dry mix with a liquid to form a batter.

22. A frying composition for frying comestibles in a fat or oil comprising:
   an amount of an emulsifier effective to foam the fat or oil and create at least a 25% increase in the height of the fat or oil when the comestible is fried in the fat or oil containing the frying composition, and wherein the amount of fat or oil and emulsifier present when the comestible is fried is effective to foam said fat or oil at a level sufficient to cook said comestible in the foaming frying medium and create an artificially high level of heat transfer medium.

23. Frying composition of claim 22 wherein the emulsifier is selected from the group consisting of lecithin, the citric acid ester of mono and diglycerides, phosphated mono and diglycerides, sodium stearyl fumarate and sodium sulfo-acetate derivatives of mono and diglycerides.

24. Frying composition of claim 23 wherein the emulsifier is lecithin and the amount of emulsifier is within the range of about 3 to 35% by weight of the fat or oil.

25. Frying composition of claim 24 wherein the amount of emulsifier is within the range of about 4 to 10% by weight of the fat or oil.

26. Frying composition of claims 22, 23, 24 or 25 further comprising a fat or oil.

* * * * *